(12) United States Patent
Tsay et al.

(10) Patent No.: US 8,308,596 B2
(45) Date of Patent: Nov. 13, 2012

(54) TRANSMISSION MECHANISM WITH INTERMITTENT OUTPUT MOVEMENT

(75) Inventors: Der-Min Tsay, Kaohsiung (TW);
Hsin-Pao Chen, Kaohsiung (TW);
Hsien-Wen Hsu, Kaohsiung (TW);
Chih-Wei Huang, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 589 days.

(21) Appl. No.: 12/606,774

(22) Filed: Oct. 27, 2009

(65) Prior Publication Data
US 2010/0126290 A1    May 27, 2010

(30) Foreign Application Priority Data

Nov. 27, 2008    (TW) ................. 97146066 A

(51) Int. Cl.
*F16H 35/02*    (2006.01)
*F16H 37/12*    (2006.01)
(52) U.S. Cl. .......................................... 475/14; 475/162
(58) Field of Classification Search .............. 475/14, 475/17, 162, 180
See application file for complete search history.

(56) References Cited

U.S. PATENT DOCUMENTS

| | | | | |
|---|---|---|---|---|
| 1,731,285 A | * | 10/1929 | Anglada | 475/16 |
| 2,476,716 A | * | 7/1949 | Fields | 74/60 |
| 3,383,929 A | | 5/1968 | Grutter | |
| 6,439,071 B2 | | 8/2002 | Perez | |
| 2008/0125266 A1 | * | 5/2008 | Pohl | 475/17 |

FOREIGN PATENT DOCUMENTS
TW    I272351    9/2004
* cited by examiner

*Primary Examiner* — Justin Holmes
(74) *Attorney, Agent, or Firm* — Muncy, Geissler, Olds & Lowe, PLLC

(57) ABSTRACT

A transmission mechanism with intermittent output movement includes an output shaft rotatably mounted to first and second cams and a sun gear mounted to the output shaft. A first rocker includes a first planet gear meshed with the sun gear and first and second rollers rotatably mounted on opposite sides of the first planet gear and respectively in contact with the first and second cams. A second rocker includes a second planet gear meshed with the sun gear. An end of a first connecting rod is mounted to the first rocker. An end of a second connecting rod is mounted to the second rocker. Two ends of a link are rotatably mounted to the other ends of the first and second connecting rods. A planet gear carrier is mounted to an input shaft coaxial to the input shaft and includes an end rotatably mounted to the first rocker.

10 Claims, 10 Drawing Sheets

TRANSMISSION MECHANISM WITH INTERMITTENT OUTPUT MOVEMENT

BACKGROUND OF THE INVENTION

1. Field of the Invention

The present invention relates to a transmission mechanism with intermittent output movement and, more particularly, to a transmission mechanism capable of converting continuous input movement into intermittent output movement.

2. Description of the Related Art

Taiwan Patent Publication No. 1272351 discloses an adjustable reciprocating movement mechanism including a power device using a motor as a power source, a power input mechanism, a variable speed mechanism, and a power output mechanism. The power input mechanism includes a driving gear driven by the motor and a driven gear driven by the driving gear. The variable speed mechanism includes a base having an annular groove in which a roller is slideably received. An input shaft extends through the base and includes a first end to which the driven gear is mounted and a second end to which a planet gear carrier is mounted. A planet gear and a roller arm are rotatably mounted to the planet gear carrier. The roller is rotatably mounted to the roller arm. The power output mechanism includes an output shaft mounted to the base. A sun gear is mounted to an end of the output shaft and meshes with the planet gear of the variable speed mechanism. An eccentric wheel is mounted to the other end of the output shaft extending through the base. A plurality of coupling holes is formed in an eccentric portion of the eccentric wheel. An input end of a driven member is rotatably engaged in one of the coupling holes of the eccentric wheel. The variable speed mechanism can output variable speed, and the annular groove allows output of intermittent movement. However, the cost for forming the annular groove is high, and the heat treatment after formation of the annular groove is difficult. Furthermore, the roller rotatably mounted to a side of the roller arm acts like a cantilever beam, which is liable to wobble and deform during high speed operation, leading to abnormal wear to the annular groove and the roller. Further, the planet gear carrier and the roller arm are a single-arm type linking mechanism that tends to produce shaking force and shaking movement due to weight imbalance between the planet gear carrier and the roller arm. Thus, the adjustable reciprocating movement mechanism has poor dynamic characteristics and can not achieve dynamic balance, failing to operate stably at high input speed.

SUMMARY OF THE INVENTION

The primary objective of the present invention is to provide a transmission mechanism with intermittent output movement capable of lowering the load on a single side of each of two planet gears thereof to provide enhanced dynamic balance and rotational stability for application in high speed operation.

Another objective of the present invention is to provide a transmission mechanism with intermittent output movement that can be manufactured at low costs.

A further objective of the present invention is to provide a transmission mechanism with intermittent output movement capable of avoiding abnormal wear to a conjugate cam unit and rollers thereof.

The present invention fulfills the above objectives by providing, in a preferred form, a transmission mechanism with intermittent output movement including a conjugate cam unit having first and second cams. Each of the first and second cams includes a base circle having a center. An output shaft is rotatably mounted to the centers of the base circles of the first and second cams. A sun gear is mounted to the output shaft. A first rocker includes a first planet gear meshed with the sun gear. The first rocker further includes first and second rollers rotatably mounted on opposite sides of the first planet gear in a plane perpendicular to a central axis of the output shaft. The first roller is in contact with the first cam, and the second roller is in contact with the second cam. A second rocker includes a second planet gear meshed with the sun gear. A transmission unit includes first and second connecting rods and a link. The first connecting rod includes a first end mounted to the first rocker and a second end. The second connecting rod includes a first end mounted to the second rocker and a second end. Two ends of the link are rotatably mounted to the second ends of the first and second connecting rods. An input shaft is coaxial to the input shaft. A planet gear carrier is mounted to the input shaft and includes an end rotatably mounted to the first rocker.

The force imparted to the sun gear is distributed to the areas meshing with the first and second planet gears. The load on the single side of the first and second planet gears is also minimized. The mass difference between two sides of the sun gear is reduced, achieving dynamic balance of the transmission mechanism according to the teachings of the present invention. Thus, the transmission mechanism according to the teachings of the present invention possesses better dynamic characteristics and can be utilized in high speed operation.

In preferred forms, the first and second cams are plate cams that can be manufactured easily.

The first and second rollers rotatably mounted to two sides of the first rocker act like a simply supported beam, avoiding deformation of the rollers and avoiding abnormal wear to the conjugate cam nit and the rollers.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
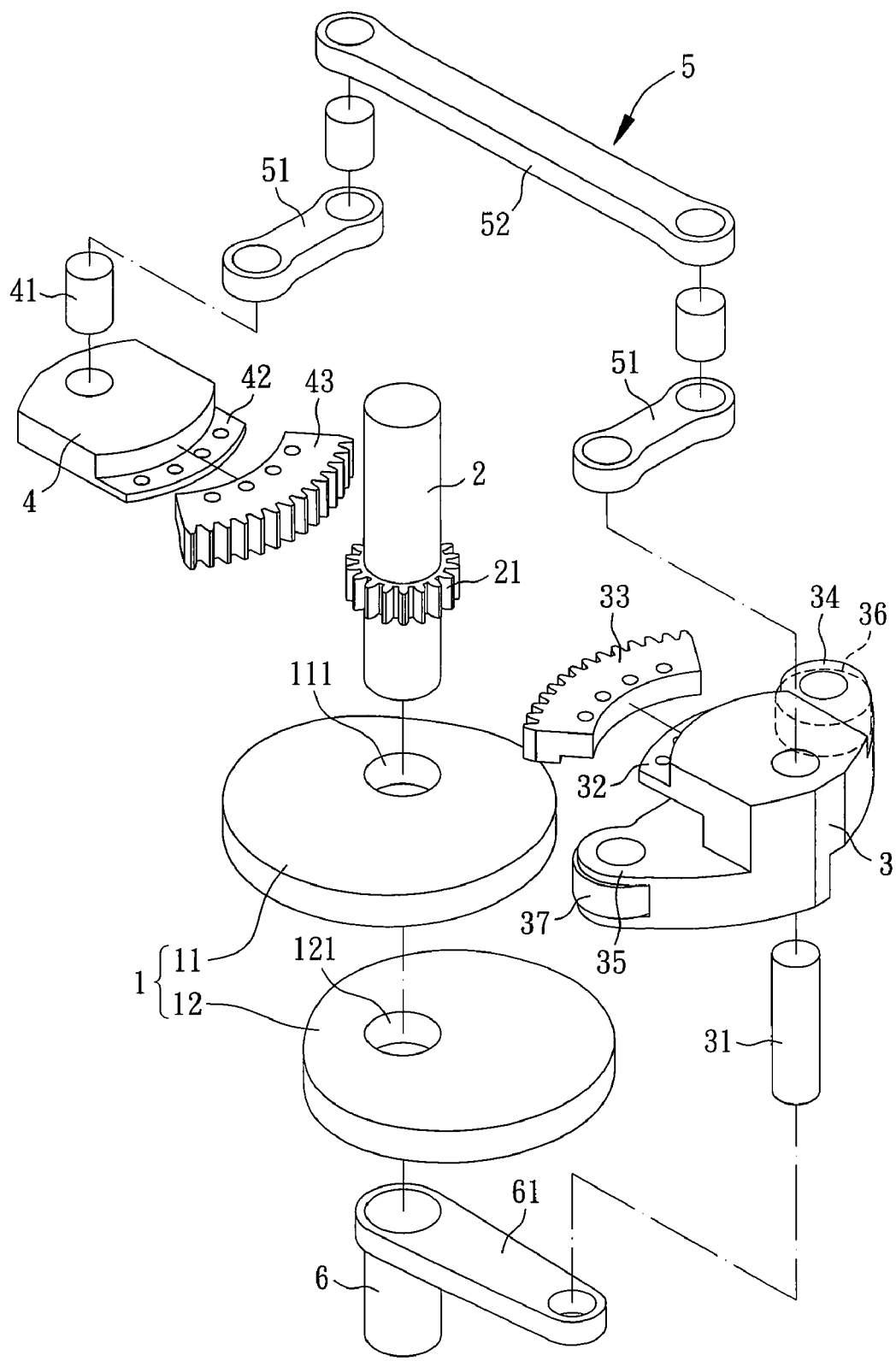
FIG. 1 shows an exploded, perspective view of a transmission mechanism with intermittent output movement of a first embodiment according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "outer", "end", "portion", "axial", "annular", "spacing", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

FIG. 1 shows a transmission mechanism with intermittent output movement of a first embodiment according to the preferred teachings of the present invention. The transmission mechanism includes a conjugate cam unit 1, an output shaft 2, a first rocker 3, a second rocker 4, a transmission unit 5, and an input shaft 6.

The conjugate cam unit 1 includes first and second cams 11 and 12 that are preferably plate cams and have different shapes. The first cam 11 has an axial hole 111 preferably located in a center of a base circle of the first cam 11. The second cam 12 has an axial hole 121 preferably located in a center of a base circle of the second cam 12. The first and second cams 11 and 12 are superimposed with the axial holes 111 and 121 aligned with each other. The superimposed first and second cams 11 and 12 can be fixed to a frame by a pin or the like.

The output shaft 2 is rotatably extended through the axial holes 111 and 121 of the first and second cams 11 and 12. A sun gear 21 is mounted on the output shaft 2 and preferably in the form of an external gear. The sun gear 21 can be mounted to or integrally formed with an outer periphery of the output shaft 2.

A rocker shaft 31 is fixed to the first rocker 3 and has two ends extending beyond the first rocker 3 and on opposite sides of the first rocker 3. A planet gear 33 is fixed by a screw or pin to a fixed portion 32 of the rocker 3 and preferably in the form of a sector-shaped rack. Alternatively, the planet gear 33 can be integrally formed with the first rocker 3. The first rocker 3 further includes first and second arms 34 and 35 on opposite sides of the planet gear 33 in a plane perpendicular to a central axis of the rocker shaft 31 (i.e., perpendicular to a central axis of the output shaft 2). A first roller 36 is rotatably mounted to an end of the first arm 34, and a second roller 37 is rotatably mounted to an end of the second arm 35. The first and second cams 11 and 12 are superimposed along the central axis of the rocker shaft 31. The first and second rollers 36 and 37 are spaced along the central axis of the rocker shaft 31, such that the first roller 36 is in contact with the first cam 11 and that the second roller 37 is in contact with the second cam 12.

A fixed shaft 41 is mounted to the second rocker 4 and has an end extending beyond the second rocker 4. A planet gear 43 is mounted by a screw or a pin to a fixed portion 42 of the second rocker 4 and preferably in the form of a sector-shaped rack. Alternatively, the planet gear 43 can be integrally formed with the second rocker 4.

The transmission unit 5 includes two connecting rods 51 and a link 52. An end of one of the connecting rods 51 is mounted to the first rocker 3 and preferably to an end of the rocker shaft 31 of the first rocker 3. An end of the other connecting rod 51 is mounted to the second rocker 4 and preferably to the other end of the fixed shaft 41 of the second rocker 4. The other ends of the connecting rods 51 are respectively and rotatably mounted to two ends of the link 52.

A planet gear carrier 61 is mounted to an end of the input shaft 6. The output shaft 6 can be fixed to an end of the planet gear carrier 61. The other end of the planet gear carrier 61 is rotatably mounted to the other end of the rocker shaft 31.

Figure 2:
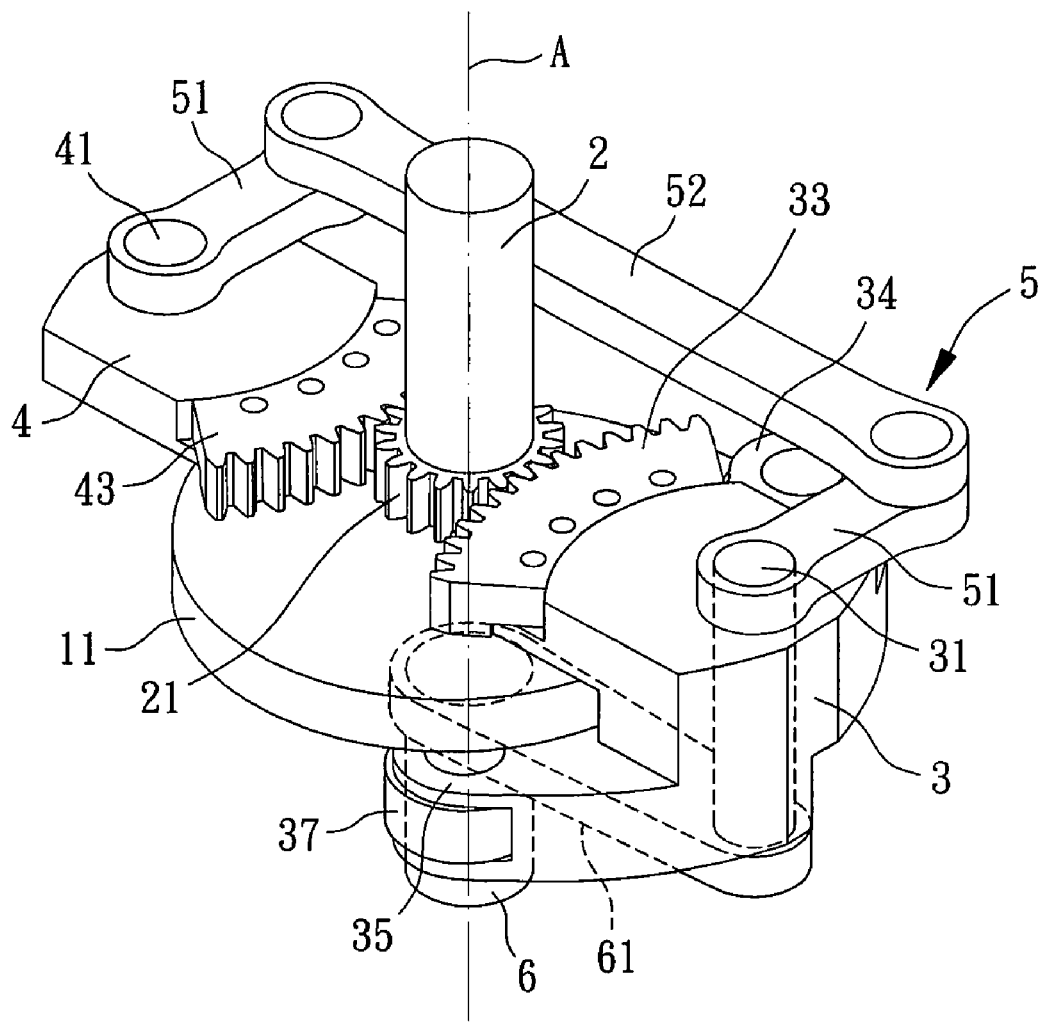
FIG. 2 shows a perspective view of the transmission mechanism of FIG. 1.
Figure 3:
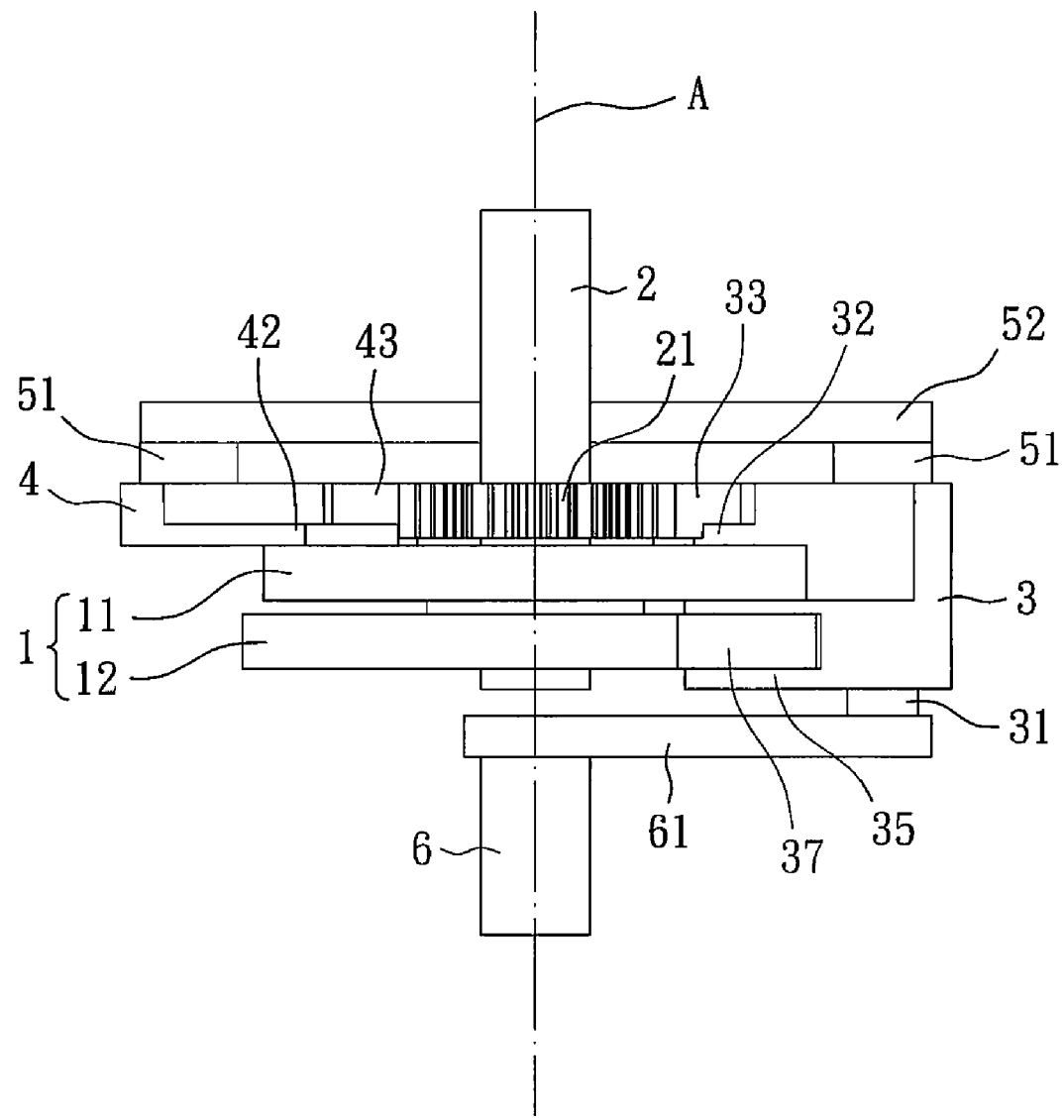
FIG. 3 shows a side view of the transmission mechanism of FIG. 1.

With reference to FIGS. 1-3, in assembly of the transmission mechanism of the first embodiment according to the teachings of the present invention, the first and second cams 11 and 12 of the conjugate cam unit 1 are superimposed and then fixed to a frame with the axial hole 111 of the first cam 11 aligned with the axial hole 121 of the second cam 12. The output shaft 2 is rotatably extended through the axial holes 111 and 121 of the first and second cams 11 and 12. The planet gear 33 of the first rocker 3 and the planet gear 43 of the second rocker 4 mesh with the sun gear 21 on the output shaft 2 with the first roller 36 of the first rocker 3 in contact with the first cam 11 and with the second roller 37 of the first rocker 3 in contact with the second cam 12. An end of one of the connecting rods 51 is mounted to an end of the rocker shaft 31. An end of the other connecting rod 51 is mounted to the other end of the fixed shaft 41. The other ends of the connecting rods 51 are respectively and pivotably mounted to two ends of the link 52. The input shaft 6 is fixed to an end of the planet gear carrier 61. The other end of the planet gear carrier 61 is rotatably mounted to the other end of the rocker shaft 31. The output shaft 2 and the input shaft 6 are coaxial (see common axis A).

Figure 4:
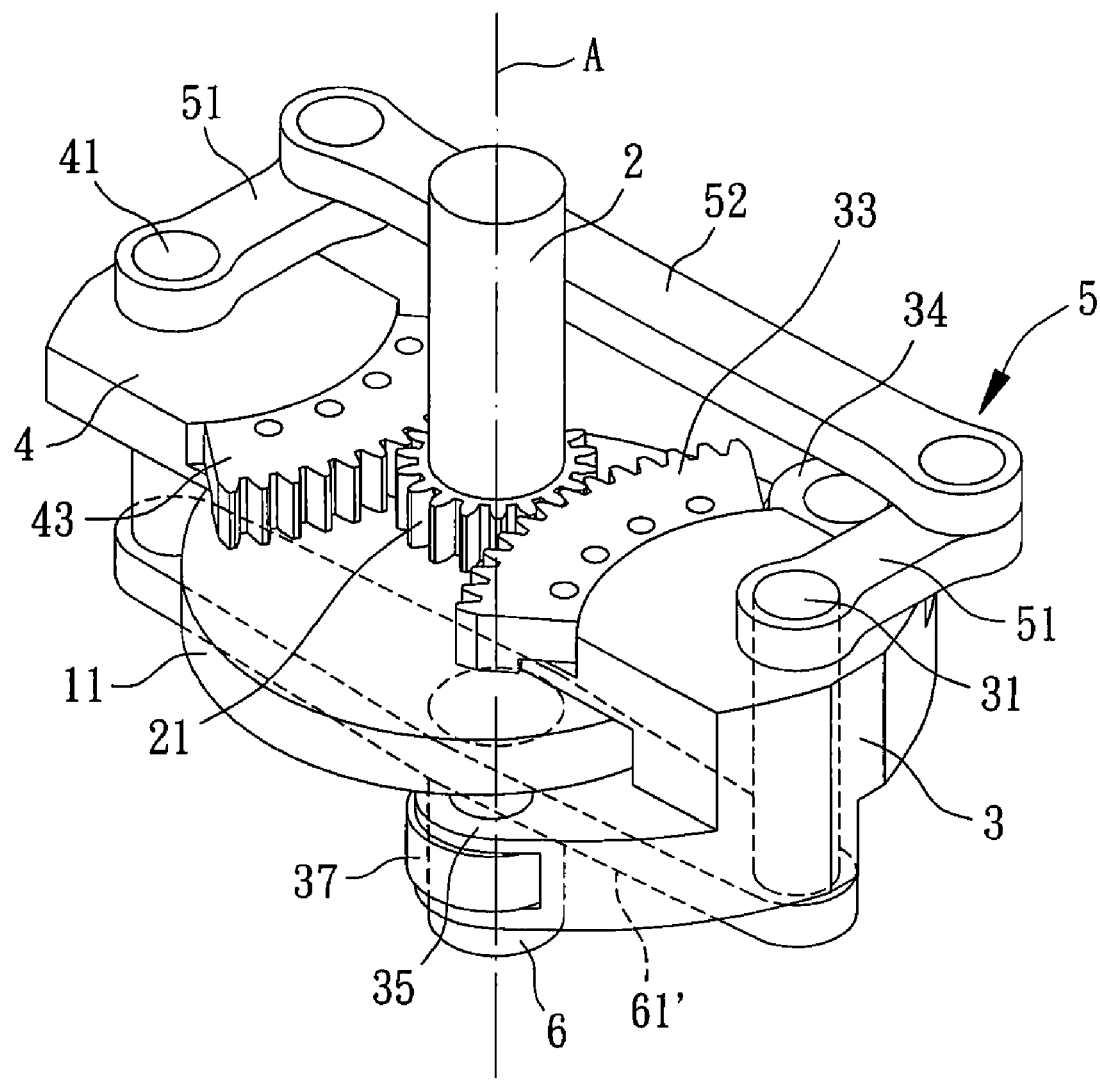
FIG. 4 shows a perspective view of a transmission mechanism with intermittent output movement of a second embodiment according to the preferred teachings of the present invention.

With reference to FIG. 4, the other end of the fixed shaft 41 can also extend beyond the second rocker 4, so that the ends of the fixed shaft 41 are on opposite sides of the second rocker 4. Furthermore, the output shaft 6 can be fixed to a middle of the planet gear carrier 61' having two ends respectively and rotatably mounted to the other end of the rocker shaft 31 of the first rocker 3 and the other end of the fixed shaft 41 of the second rocker 4, providing enhanced rotational stability for the second rocker 4. A spacing between the central axis of the rocker shaft 31 and the central axis of the input shaft 6 is equal to a spacing between the central axis of the fixed shaft 41 to the central axis of the input shaft 6.

Figure 5:
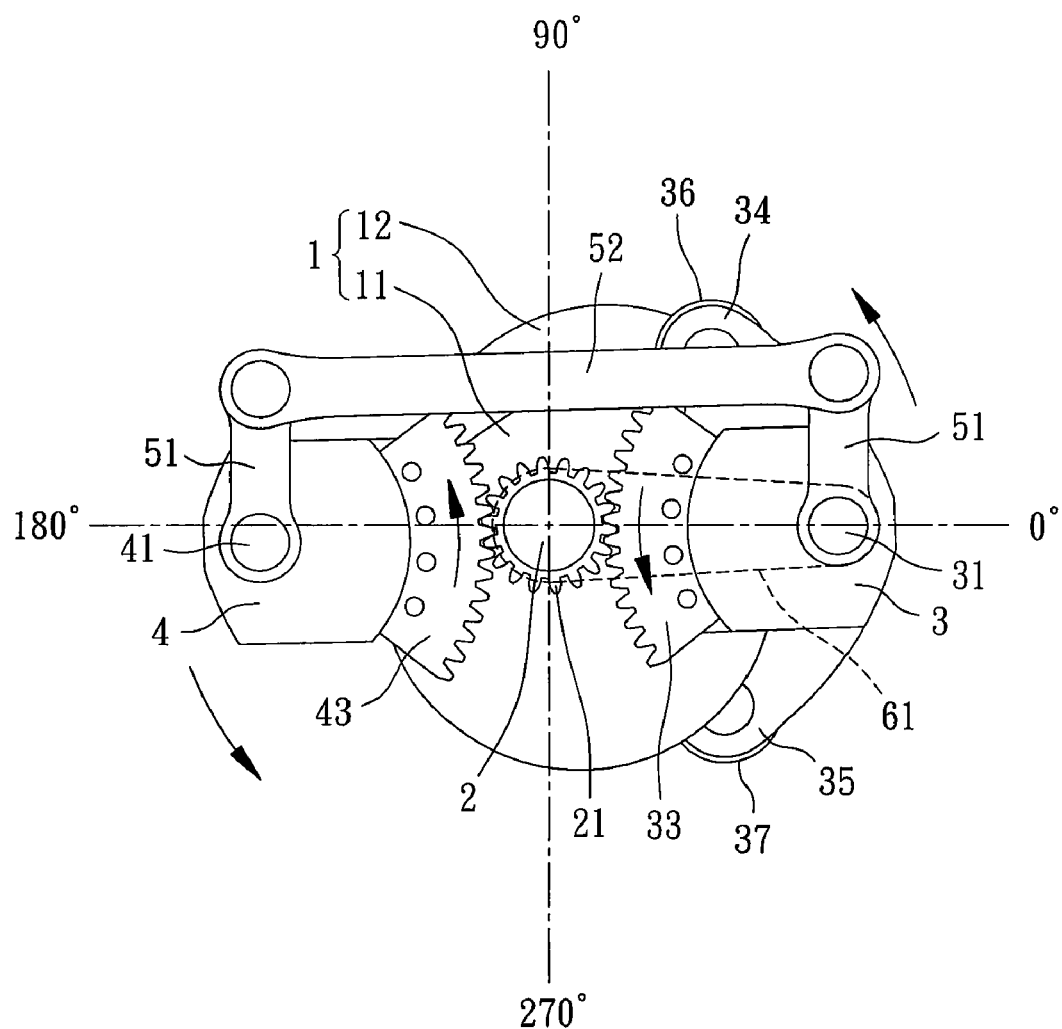
FIG. 5 shows a top view of the transmission mechanism of FIG. 1 with a planet gear carrier of the transmission mechanism at 0° position.

With reference to FIGS. 2 and 5, in operation of the transmission mechanism of the first embodiment according to the teachings of the present invention, the input shaft 6 is coupled to a power source for driving the input shaft 6 and the planet gear carrier 61 to rotate. The planet gear carrier 61 drives the first rocker 3 to rotate about the common axis A. At the same time, the first roller 36 of the first rocker 3 moves along an outer contour of the first cam 11, and the second roller 37 of the first rocker 3 moves along an outer contour of the second cam 12. Since the contours of the first and second cams 11 and 12 have different shapes, the first rocker 3 sways reciprocatingly about the central axis of the rocker shaft 31 while the first rocker 3 revolves about the common axis A along the contours of the first and second cams 11 and 12. Furthermore, the rotational movement of the first rocker 3 about the common axis A and the reciprocating swaying movement of the first rocker 3 about the central axis of the rocker shaft 31 actuate the second rocker 4 via the transmission unit 5, so that the second rocker 4 revolves about the common axis A and sways reciprocatingly about a central axis of the fixed shaft 41.

With reference to FIG. 5, since the planet gear 33 of the first rocker 3 and the planet gear 43 of the second rocker 4 mesh with the sun gear 21, when the first and second rockers 3 and 4 rotate in a counterclockwise direction, the sun gear 21 rotates in the counterclockwise direction under the action of the revolving torque in the counterclockwise direction. At the same time, when the first and second rockers 3 and 4 rotate in the counterclockwise direction along the contours of the first and second cams 11 and 12, the sun gear 21 rotates in the clockwise direction under the action of the rotating torque in the counterclockwise direction. Thus, the counterclockwise revolving torque imparted from the first and second rockers 3 and 4 to the sun gear 21 counterbalances the clockwise rotating torque imparted from the first and second rockers 3 and 4 to the sun gear 21, such that the sun gear 21 remains still. On the other hand, when the first and second arms 3 and 4 rotate in the clockwise direction along the contours of the first and second cams 11 and 12, the sun gear 21 rotates in the counterclockwise direction under the action of the clockwise revolving torque. Thus, the clockwise revolving torque and the clockwise rotating torque from the first and second rockers 3 and 4 drive the sun gear 21 in the same direction. Accordingly, the sun gear 21 rotates in the counterclockwise direction at a higher speed.

More specifically, with reference to FIG. 5, when the planet gear carrier 61 is at 0° position, the first and second rockers 3 and 4 revolve in the counterclockwise direction (and drive the sun gear 21 to rotate in the counterclockwise direction). At the same time, the first and second rockers 3 and 4 rotate in the counterclockwise direction (and drive the sun gear 21 to rotate in the clockwise direction). Thus, the sun gear 21 remains still, since the revolving torque counterbalances the rotating torque.

Figure 6:
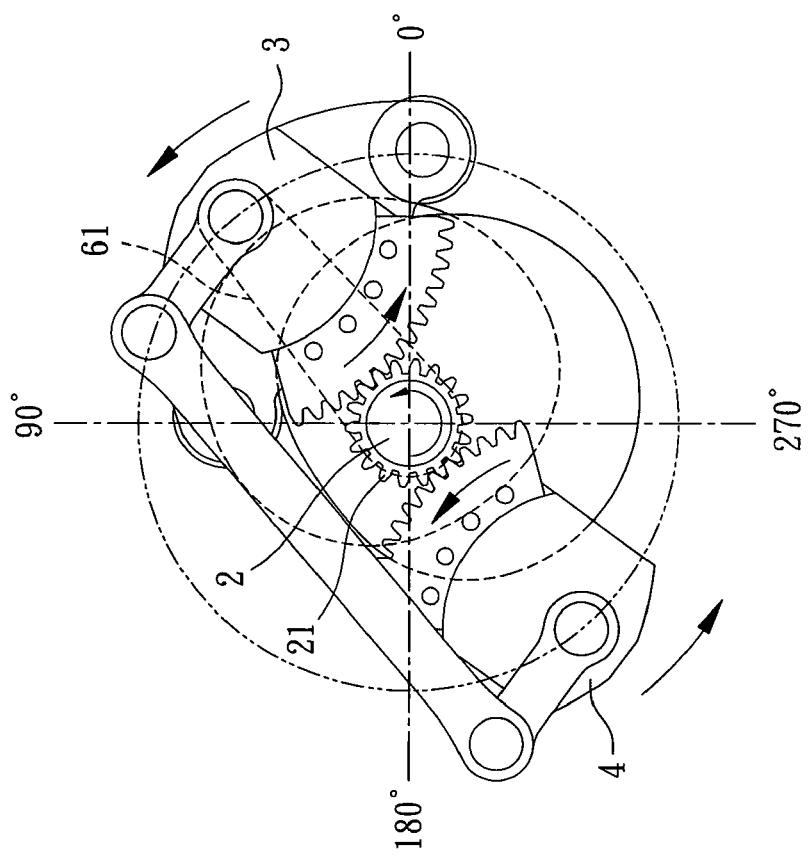
FIG. 6 shows a top view of the transmission mechanism of FIG. 1 with the planet gear carrier at 40° position.
Figure 8:
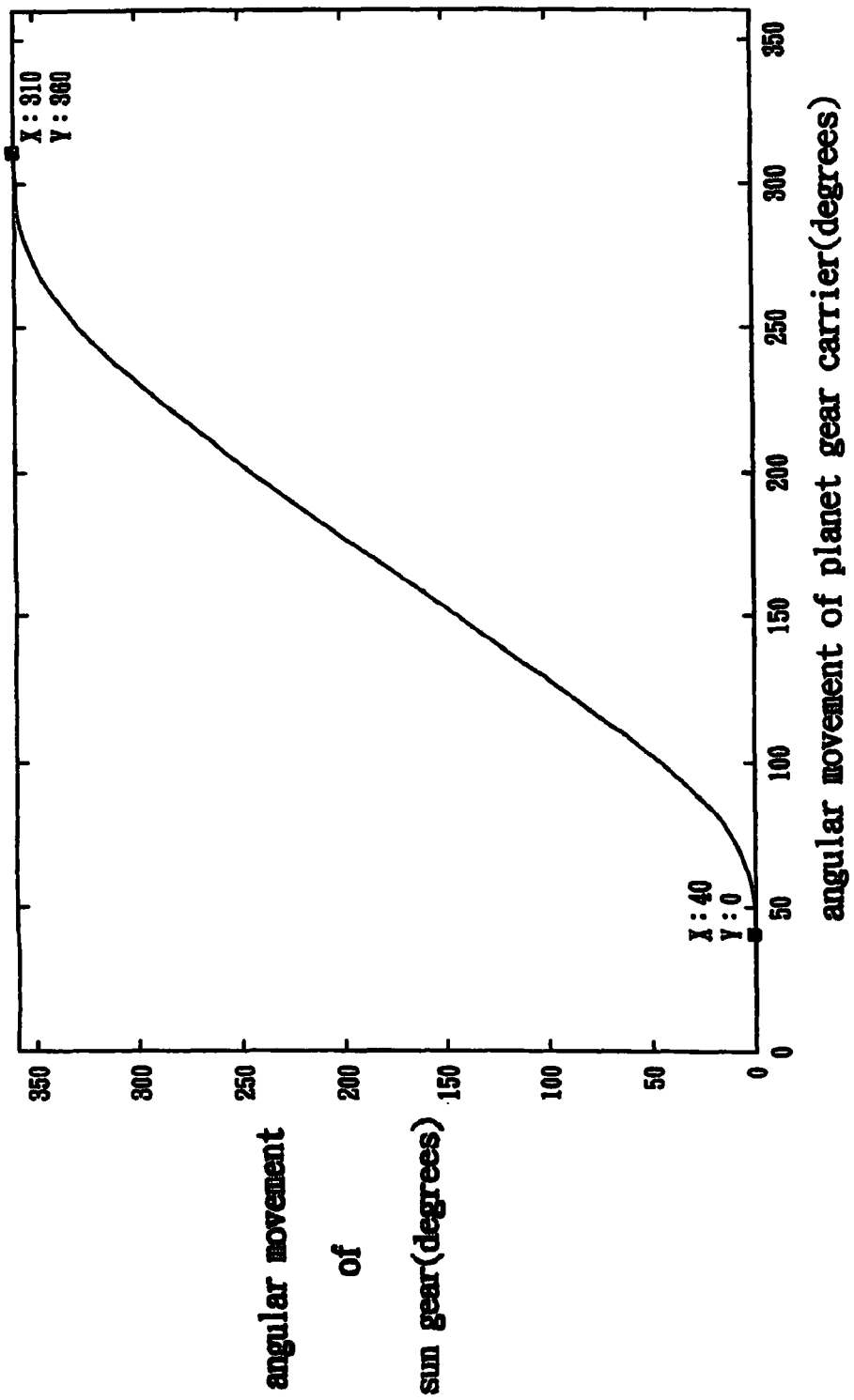
FIG. 8 shows a diagram depicting angular movement of a sun gear of the transmission mechanism of FIG. 1.

With reference to FIGS. 6 and 8, when the planet gear carrier 61 moves to 40° position, the first and second rockers 3 and 4 revolve in the counterclockwise direction (and drive the sun gear 21 to rotate in the counterclockwise direction). At the same time, the first and second rockers 3 and 4 rotate in the counterclockwise direction (and drive the sun gear 21 to rotate in the clockwise direction). However, the rotating torque becomes smaller than the revolving torque due to smaller swaying movement of the first and second rockers 3 and 4. Thus, the clockwise rotating torque can only counterbalance a portion of the counterclockwise revolving torque, and the sun gear 21 is gradually driven by the revolving torque and starts to move in the counterclockwise direction. When the first and second rockers 3 and 4 start to sway in the clockwise direction, the sun gear 21 is subjected to the revolving torque and the rotating torque simultaneously, so that the sun gear 21 gathers speed gradually (see movement of the sun gear 21 from the 40° position to 100° position in FIG. 8).

Figure 7:
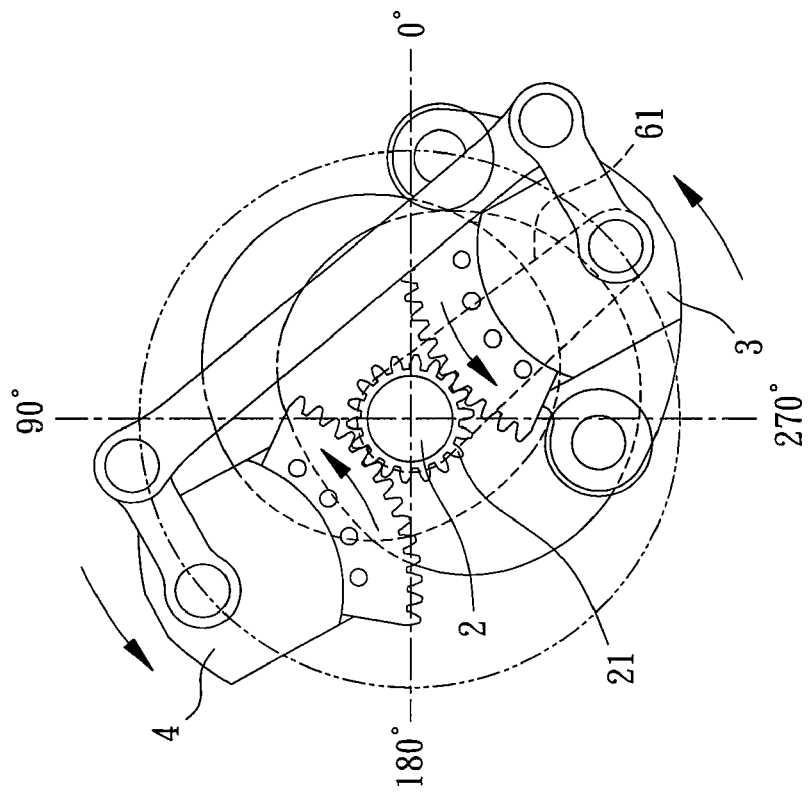
FIG. 7 shows a top view of the transmission mechanism of FIG. 1 with the planet gear carrier at 310° position.

With reference to FIGS. 7 and 8, when the planet gear carrier 61 moves between 250° position and 310° position, the first and second rockers 3 and 4 sway in the counterclockwise direction (and drive the sun gear 21 to rotate in the clockwise direction). However, the rotating torque is still smaller than the revolving torque due to smaller swaying movement of the first and second rockers 3 and 4 in the counterclockwise direction. Thus, the clockwise rotating torque can only counterbalance a portion of the counterclockwise revolving torque, such that movement of the sun gear 21 in the counterclockwise direction is slowed down until the planet gear carrier 61 moves to the 310° position. When the planet gear carrier 61 reaches the 310° position, the first and second rockers 3 and 4 revolve in the counterclockwise direction (and drive the sun gear 21 to rotate in the counterclockwise direction). Furthermore, the first and second rockers 3 and 4 rotate in the counterclockwise direction due to the contours of the first and second cams 11 and 12 (and drive the sun gear 21 to rotate in the clockwise direction). At this time, the revolving torque counterbalances the rotating torque, so that the sun gear 21 does not move.

With reference to FIG. 2, when the first and second rockers 3 and 4 revolve about the common axis A and respectively sway (rotate) about the central axes of the rocker shaft 31 and the fixed shaft 41, the sun gear 21 and the output shaft 2 are intermittently rotated. With reference to FIGS. 5, 6, and 8, when the planet gear carrier 61 rotates in the counterclockwise direction from the 0° position to the 40° position, the sun gear 21 does not move. With reference to FIGS. 6-8, when the planet gear carrier 61 rotates in the counterclockwise direction from the 40° position to the 310° position, the sun gear 21 rotates in the counterclockwise direction. With reference to FIGS. 5, 7, and 8, when the planet gear carrier 61 rotates in the counterclockwise direction from the 310° position to the 0° position, the sun gear 21 does not move. The operation repeats. Thus, continuous rotational movement of the input shaft 6 can be converted into intermittent output movement of the output shaft 2 at variable speed. The output shaft 2 rotates a round when the input shaft 6 rotates a round.

The first and second rockers 3 and 4 of the transmission mechanism according to the teachings of the present invention sway due to the contours of the first and second cams 11 and 12 of the conjugate cam unit 1. Thus, the swaying angle of the first and second rockers 3 and 4 and the angular positions of the planet gear carrier 61 where the swaying direction of the first and second rockers 3 and 4 changes can be varied by changing the contours of the first and second cams 11 and 12 and/or the lengths of the first and second arms 34 and 35 of the first rocker 3. As a result, the intermittent movement angles of the output shaft 2 can be adjusted.

Figure 9:
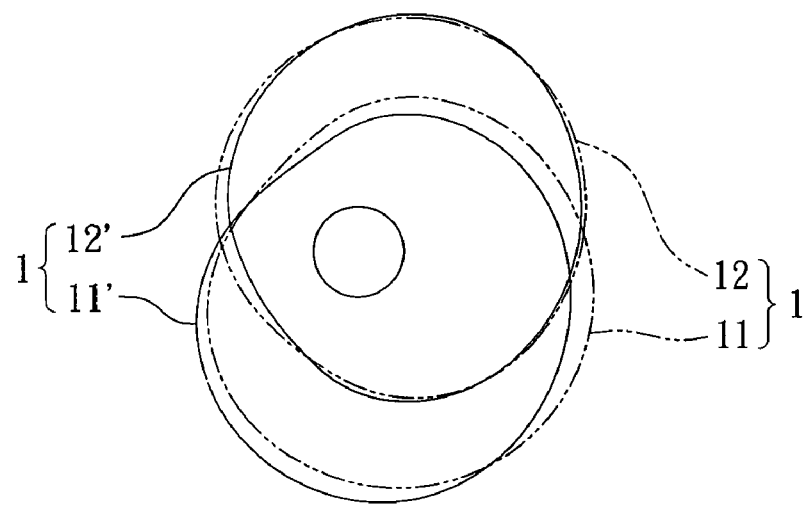
FIG. 9 is a top view illustrating difference between a conjugate cam unit of FIG. 1 and a conjugate cam unit of FIG. 4.

FIG. 9 is a top view illustrating the difference between the contours of the first and second cams 11 and 12 (phantom lines) of the conjugate cam unit 1 of the transmission mechanism of the first embodiment shown in FIG. 1 and the contours of the first and second cams 11' and 12' (solid lines) of the conjugate cam unit 1 of the transmission mechanism of the second embodiment shown in FIG. 4. By providing the first and second cams 11' and 12' with different contours, the swaying angle of the first and second rockers 3 and 4 and the angular positions of the planet gear carrier 61 where the swaying direction of the first and second rockers 3 and 4 changes can be changed, adjusting the intermittent movement angles of the output shaft 2.

The structure of the transmission mechanism of the second embodiment is substantially the same as that of the first embodiment except the contours of the first and second cams 11' and 12'. The change in the operation due to the different contours of the first and second cams 11' and 12' will be described hereinafter.

Figure 10:
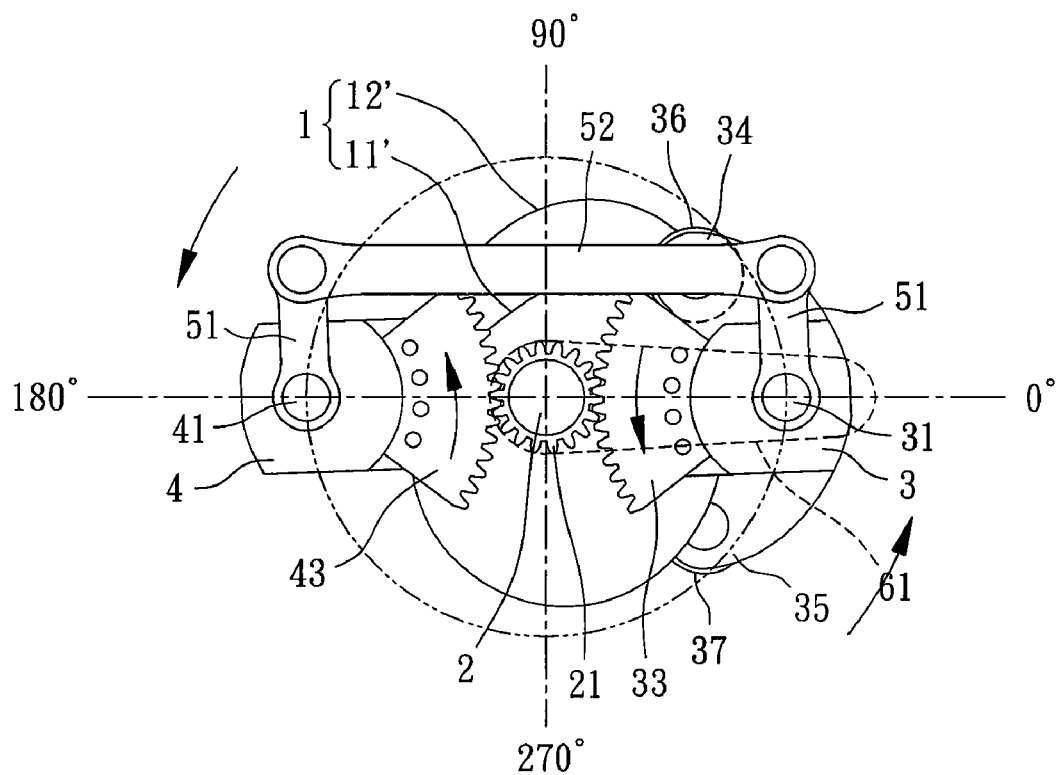
FIG. 10 shows a top view of the transmission mechanism of FIG. 4 with a planet gear carrier of the transmission mechanism at 0° position.

With reference to FIG. 10, when the planet gear carrier 61 is at the 0° position, the first and second rockers 3 and 4 revolves in the counterclockwise direction (and drive the sun gear 21 to rotate in the counterclockwise direction). At the same time, the first and second rockers 3 and 4 rotate in the counterclockwise direction (and drive the sun gear 21 to rotate in the clockwise direction). Thus, the sun gear 21 remains still, since the revolving torque counterbalances the rotating torque.

Figure 11:
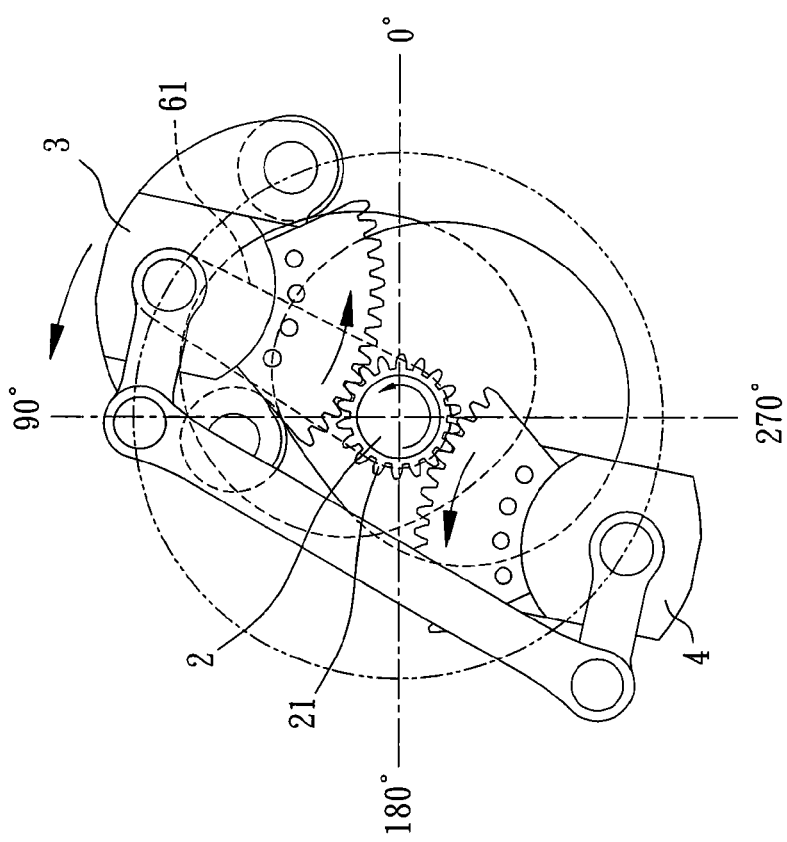
FIG. 11 shows a top view of the transmission mechanism of FIG. 4 with the planet gear carrier at 60° position.
Figure 13:
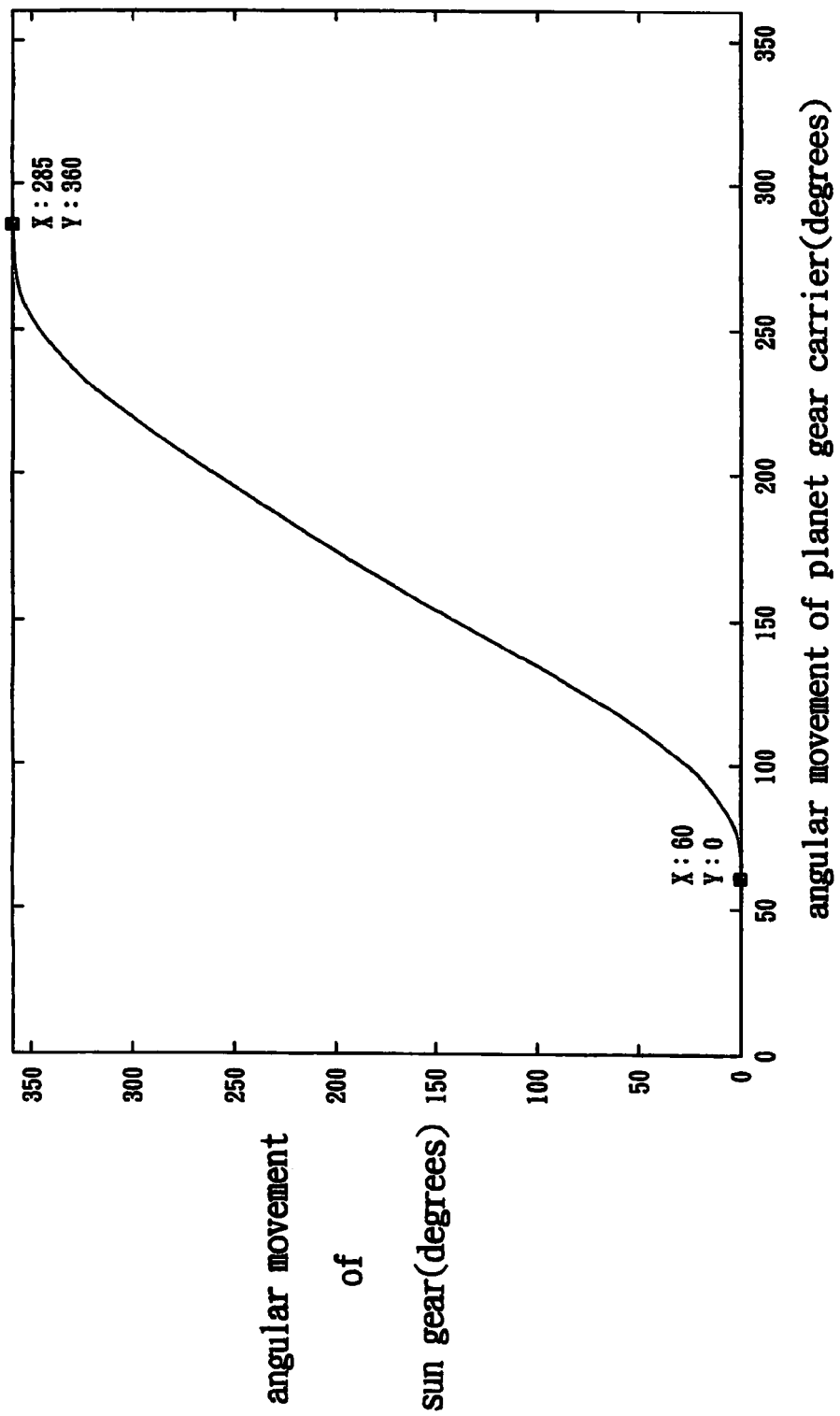
FIG. 13 shows a diagram depicting angular movement of a sun gear of the transmission mechanism of FIG. 4.

With reference to FIGS. 11 and 13, when the planet gear carrier 61 moves to the 60° position, the first and second rockers 3 and 4 revolve in the counterclockwise direction (and drive the sun gear 21 to rotate in the counterclockwise direction). Although, the first and second rockers 3 and 4 still rotate in the counterclockwise direction (and drive the sun gear 21 to rotate in the clockwise direction), the rotating torque becomes smaller than the revolving torque due to smaller swaying movement of the first and second rockers 3 and 4. Thus, the clockwise rotating torque can only counterbalance a portion of the counterclockwise revolving torque, and sun gear 21 is gradually driven by the revolving torque and starts to move in the counterclockwise direction.

Figure 12:
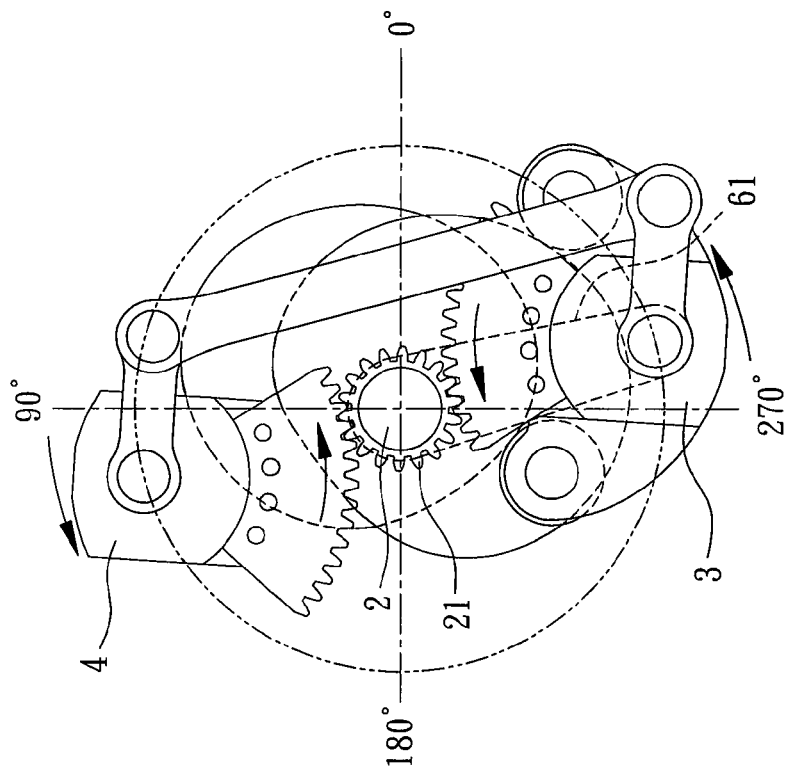
FIG. 12 shows a top view of the transmission mechanism of FIG. 4 with the planet gear carrier at 285° position.

With reference to FIGS. 12 and 13, when the planet gear carrier 61 moves to 285° position, the first and second rockers 3 and 4 revolve in the counterclockwise direction (and drive the sun gear 21 to rotate in the counterclockwise direction). Furthermore, the first and second rockers 3 and 4 rotate in the counterclockwise direction due to the contours of the first and second cams 11 and 12 (and drive the sun gear 21 to rotate in the clockwise direction). At this time, the revolving torque counterbalances the rotating torque, so that the sun gear 21 does not move.

Comparing FIG. 6 with FIG. 11, the sun gear 21 and the output shaft 2 of the first embodiment start to rotate when the planet gear carrier 61 reaches the 40° position, whereas the sun gear 21 and the output shaft 2 of the second embodiment start to rotate when the planet gear carrier 61 reaches the 60° position. Comparing FIG. 7 with FIG. 12, the sun gear 21 and the output shaft 2 of the first embodiment stop rotating when the planet gear carrier 61 reaches the 310° position, whereas the sun gear 21 and the output shaft 2 of the second embodiment stop rotating when the planet gear carrier 61 reaches the 285° position. Thus, the intermittent movement angles of the output shaft 2 of the transmission mechanism according to the teachings of the present invention can indeed be adjusted by changing the contours of the conjugate cam unit 1.

According to the above, the force imparted to the sun gear 21 of the transmission mechanism with intermittent output movement according to the teachings of the present invention is distributed to the areas meshing with the two planet gears 33 and 43. Namely, the load on the single side of the planet gears 33 and 43 can be reduced, and the mass difference between two sides of the sun gear 21 can be reduced, achieving dynamic balance of the transmission mechanism with intermittent output movement according to the teachings of the present invention. Thus, the transmission mechanism with intermittent output movement according to the teachings of the present invention possesses better dynamic characteristics and can be utilized in high speed operation. Furthermore, the first and second cams 11 and 12, 11' and 12' can be plate cams that can be manufactured easily and allow easy subsequent heat treatment, lowering the manufacturing costs and avoiding abnormal wear to the first and second cams 11 and 12, 11' and 12' and the rollers 36 and 37.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A transmission mechanism with intermittent output movement comprising:
   a conjugate cam unit including a first cam and a second cam each having a base circle with a center;
   an output shaft rotatably mounted to the centers of the base circles of the first cam and the second cam, with a sun gear mounted to the output shaft;
   a first rocker including a first planet gear meshed with the sun gear, with the first rocker further including a first roller and a second roller rotatably mounted on opposite sides of the first planet gear in a plane perpendicular to a central axis of the output shaft, with the first roller in contact with the first cam, with the second roller in contact with the second cam;
   a second rocker including a second planet gear meshed with the sun gear;
   a transmission unit including a first connecting rod and a second connecting rod and a link, with the first connecting rod including a first end mounted to the first rocker and a second end, with the second connecting rod including a first end mounted to the second rocker and a second end, with the link having two ends pivotably mounted to the second ends of the first connecting rod and the second connecting rod; and
   an input shaft coaxial to the output shaft, with a planet gear carrier mounted to the input shaft and including an end rotatably mounted to the first rocker.

2. The transmission mechanism as claimed in claim 1, with each of the first cam and the second cam including an axial hole, with the axial holes of the first cam and the second cam aligned with each other, and with the output shaft rotatably extending through the axial holes of the first cam and the second cam.

3. The transmission mechanism as claimed in claim 1, with each of the first cam and the second cam being plate cams, and with the first cam having a contour different from that of the second cam.

4. The transmission device as claimed in claim 1, with each of the first rocker and the second rocker including a fixed portion, and with the first planet gear and the second planet gear respectively mounted to the fixed portions of the first rocker and the second rocker.

5. The transmission device as claimed in claim 1, with a fixed shaft mounted to the second rocker and including an end on a side of the second rocker, with the end of the fixed shaft fixed to the first end of the second connecting rod.

6. The transmission device as claimed in claim 5, with the fixed shaft including another end on another side of the second rocker, and with the other end of the fixed shaft rotatably mounted to another end of the planet gear carrier.

7. The transmission device as claimed in claim 1, with a rocker shaft mounted to the first rocker and including a first end and a second end on opposite sides of the first rocker, with the first end of the rocker shaft mounted to the first end of the first connecting rod, and with the second end of the rocker shaft rotatably mounted to the end of the planet gear carrier.

8. The transmission device as claimed in claim 7, with the first rocker including a first arm and a second arm, with the first roller rotatably mounted to the first arm, with the second roller rotatably mounted to the second arm, and with the first roller and the second roller spaced along a central axis of the rocker shaft.

9. The transmission device as claimed in claim 7, with a fixed shaft mounted to the second rocker and including an end on a side of the second rocker, with the fixed shaft including another end on another side of the second rocker, and with the other end of the fixed shaft rotatably mounted to another end of the planet gear carrier.

10. The transmission device as claimed in claim 9, with the input shaft is mounted to a middle of the planet gear carrier, with a spacing between the central axis of the rocker shaft and a central axis of the input shaft equal to a spacing between the central axis of the fixed shaft to a central axis of the input shaft.

* * * * *